United States Patent

[11] 3,627,870

| [72] | Inventors | Frank E. Carevic<br>West Chester;<br>John A. Milhalik, Swathmore; Alfred H. Stewart, Jr., Media, all of Pa. |
|---|---|---|
| [21] | Appl. No. | 37,036 |
| [22] | Filed | May 13, 1970 |
| [45] | Patented | Dec. 14, 1971 |
| [73] | Assignee | FMC Corporation<br>Philadelphia, Pa.<br>Continuation-in-part of application Ser. No. 814,206, Apr. 7, 1969, now abandoned, which is a continuation of application Ser. No. 543,067, Apr. 18, 1966, now abandoned. This application May 13, 1970, Ser. No. 37,036 |

[54] METHOD OF FORMING SYNTHETIC RESIN DELUSTERED SURFACES
4 Claims, No Drawings

[52] U.S. Cl. .................................................. 264/316, 106/38.23, 106/168

[51] Int. Cl. .................................................. B29c 1/04
[50] Field of Search ...................................... 106/38.23, 164, 165, 168; 260/212; 117/145; 264/316

[56] References Cited
UNITED STATES PATENTS

| 2,999,782 | 9/1961 | Justice et al. | 106/168 |
| 3,275,580 | 9/1966 | Battista | 117/145 X |
| 3,373,237 | 3/1968 | Mihalik et al. | 264/316 |

Primary Examiner—Lorenzo B. Hayes
Attorneys—Thomas R. O'Malley, George F. Mueller and Robert G. Hoffmann ABSTRACT: A method of forming synthetic resin articles having a controlled degree of luster by setting the resin in contact with a nonfibrous cellulosic release sheet containing an anchoring agent and finely divided water-insoluble particles of $\beta$-1,4 glucan or a water-insoluble derivative thereof specific particle sizes.

METHOD OF FORMING SYNTHETIC RESIN DELUSTERED SURFACES

This application is a continuation-in-part of our copending application Ser. No. 814,206, filed Apr. 7, 1969, now abandoned which application is a continuation of application Ser. No. 543,067, filed in Apr. 18, 1966, now abandoned.

In the forming of a wide variety of articles, synthetic resins are used as coatings or laminated structures are formed by impregnating sheet materials with synthetic resins and molding the article to shape. Common articles of this type are countertops, tabletops and molded radio and television cabinets. For many applications, particularly furniture items, the high gloss obtained from highly polished mold surfaces was objectionable. Press plates have been used having various surface finishes. However, for different degrees of gloss finish or luster, separate plates are required each having a specific surface finish and replacement of the plates from time to time is necessary due to the normal wear of the surface. Alternatively, it was necessary to incorporate in the resin a delustering agent or to form the surfaces with a mirror or high-gloss finish and subject the surfaces to an abrading action to provide the desired luster.

One of the objects of the present invention is to provide a simple method of forming synthetic resin surfaces having a reduced gloss or delustered surface.

Another object of the invention is to provide a method of molding or casting synthetic resins in contact with a film which will impart any desired reduced gloss to the surface of the resin and adhere to the resin surface to provide protection to the surface during handling.

Other objects and advantages of the invention will become apparent from the following description and claims.

In accordance with the present invention, the synthetic resin is molded or cast in contact with a cellulosic film containing a specific form of finely-divided $\beta$–1,4 glucan-containing material and an anchoring agent of the class commonly used for coated cellulosic films.

The cellulosic film is preferably a regenerated cellulose film prepared by any conventional method. In forming the film, the finely-divided $\beta$–1,4 glucan-containing material is preferably mixed with the viscose just prior to extrusion into the spinning bath. The anchoring agent may be applied during the wet processing of the cellulosic sheet along with a usual plasticizing agent. The specific form of finely-divided $\beta$–1,4 glucan-containing organic material in the cellulosic film or sheet is an organic material having a particle size at least about 85 percent by weight being no greater than about 44 microns and not more than about 3 percent by weight having a size greater than 74 microns, the average particle size being from about 10 to 30 microns, preferably about 15 to about 20 microns. When the particle size of the $\beta$–1,4 glucan-containing material falls below this average particle size, the film shows a marked decrease in ability to control gloss on the plastic article surface. On the other hand, when the particles are larger than the prescribed size, the plastic article surface will be undesirably pitted or etched.

The $\beta$–1,4 glucan-containing material is a water-insoluble, organic material of which a major proportion is $\beta$–1,4 glucan and is originally derived from cellulose-containing plant life, in most instances, wood, cotton, and bast or leaf fibers. In general, materials obtained from a holocellulose source are most useful, for example, ramie, flax, hemp, cotton, processed cellulose-containing material, for example, cotton linters, purified cotton, wood pulp such as bleached sulfite and sulfate pulps, regenerated forms of cellulose including rayon and cellophane, and the like. If the source material is too low in $\beta$–1,4 glucan content, it is purified to remove nonessential or undesirable components which are predominantly polysaccharides, such as pentosans, galactomannans, glucomannans, and the like, to provide a product containing at least a major proportion and preferably from 90 to about 99 percent of $\beta$–1,4 glucan.

Hereinafter, the term "cellulose" will be used to represent $\beta$–1,4 glucan-containing materials for ease of explanation and illustration.

The production of the finely-divided material may be facilitated by first subjecting the cellulose material to chemical degradation in a known manner, for example, the material may be subjected to acid or alkali hydrolysis, or enzymatic treatment. One specific method of obtaining the desired result is reported in U.S. Pat. No. 2,978,446, issued Apr. 4, 1961, to O. A. Battista et al., wherein cellulose is subjected to a 2.5 normal aqueous solution of hydrochloric acid at boiling (about 105° C.) for 15 minutes. This more drastic hydrolysis treatment provides a material which may be readily mechanically attrited in an aqueous medium with a nominal amount of energy. Similar treatments with mineral acids or alkali under more or less drastic conditions will produce attritable degraded cellulose using nominal or increased energy for disintegration of the material to the proper particle size.

Mechanical attrition may be carried out by known techniques using, for example, kitchen type mixers, blenders, planetary mixers, ball mills, attrition mills, sonic mixers, high-speed shearing devices and the like. In addition, the material may be forced through a multiplicity of fine holes whereby it is subjected to a shearing action first by passage through said holes and thereafter by rubbing together of the various particles under the influence of applied force. The disintegration is preferably carried out in the presence of an aqueous medium to appreciably reduce the energy necessary to produce smaller particle sizes. The attrition produces a mass containing some particles having a size of less than 1 micron, however, upon drying, the minute particles agglomerate to form larger sized particles. Drying may be effected by any means such as, for example, air drying, vacuum drying and spray drying. Preferably, the material for use in this invention is spray dried and in the drying the particles become somewhat hornified probably due to the temperatures normally used in the spray drying process. For the purposes of this invention, the water-insoluble, organic material containing the $\beta$–1,4 glucan should consist of particles at least about 85 percent by weight of which pass a 325 mesh screen and not more than about 3 percent by weight of which is retained on a 200 mesh screen as determined by a wet screening.

For the purposes of the invention, water-insoluble derivatives of $\beta$–1,4 glucan having the same physical characteristics and properties may be substituted for $\beta$–1,4 glucan. These derivatives include, for example, oxidation derivatives containing one or more chemical groups including aldehyde, carboxyl and mixed aldehyde-carboxyl derivatives; ether derivatives characterized by having one or more —OR groups where R may be an aliphatic or substituted aliphatic radical, either a straight or branched chain containing from one to 12 or more carbon atoms, an aryl or aralkyl or substituted aralkyl radical or a carboxyalkyl, hydroxyalkyl, cyanoalkyl, alkoxyalkyl, aralkoxyalkyl, or a dialkylaminoalkyl radical; and ester derivatives, for example, esters or inorganic acids such as nitrates, sulfates, phosphates, and esters of organic acids such as formates, acetates, propionates, butyrates, thiocyanates, mixed acetate-propionates, mixed acetate-butyrates, other aliphatic carboxylic acid derivatives containing up to 18 or more carbon atoms, and aryl or aralkyl esters such as, for example, benzoates, phenylacetates, phthalates, naphthenates, and the like.

These derivatives may be prepared before the chemical and mechanical attrition treatment by derivatizing the $\beta$–1,4 glucan-containing material to obtain a water-insoluble product, or the finely-divided $\beta$–1,4 glucan material may be derivatized to obtain essentially water-insoluble topochemical derivatives. In any event, the finely-divided $\beta$–1,4 glucan or its derivatives must be water-insoluble and have the physical characteristics and properties as described hereinbefore.

The proportion of the finely-divided cellulose incorporated in the cellulosic film may vary from about 1 percent up to about 30 percent by weight and the specific amount will be dependent upon the finish desired on the molded article. Preferably, the finely-divided material is dispersed in water and the water dispersion then added to and thoroughly mixed with the viscose. The viscose is extruded into the usual spinning bath and the film then subjected to the conventional wet aftertreatment. In the final stages of processing of cellophane, the common practice includes passing the sheet through a bath containing a plasticizing agent such as a glycol or glycerol and the anchoring agent may be included in this bath although the anchoring agent may alternatively be applied to the sheet in a separate bath. The anchoring agent is present at least adjacent the surface of the cellulosic sheet or film in an amount sufficient to improve adhesion of resinous materials thereto. The anchoring agent should not be present in such amounts as to prevent the relatively easy separation of the sheet from the plastic article without damage thereto. The amount of anchoring agent employed will depend to a great extent on the type of anchoring agent employed and the resin used in the manufacture of the resin article. In the case of a polyalkylenimine, e.g., polyethylenimine, the amount of anchoring agent can be less than a monomolecular layer at the surface of the cellulosic sheet. The finished film will contain up to 0.5 percent by weight of anchoring agent. When water-soluble or miscible melimine-formaldehyde precondensates are used, the film preferably contains from between 0.1 and 0.2 percent by weight thereof.

Any known anchoring agent which is useful in the amounts set forth for increasing adhesion between cellulosic sheets and resinous materials can be used for this invention. Examples of useful anchoring agents include melamine-formaldehyde precondensates, phenol-formaldehyde precondensates, urea-formaldehyde precondensates, guanidine-urea-formaldehyde precondensates, polyalkyl-enimines, melamine-formaldehyde-polyamine precondensates and the like. These anchoring agents may be water-soluble or water-miscible and applied in aqueous or alcoholic solutions as is well-known in the art.

The resin is molded or cast on the surface of the film in the normal manner by interposing the film between the surface of the resin and the press plate. The specific molding or casting conditions and procedure will be dependent upon the article being produced and upon the specific resin. The departure from conventional practice resides in the molding and setting of the resin surface in contact with the nonfibrous cellulosic film or sheet containing both the finely-divided water-insoluble organic particles and the anchoring agent. Upon completion of the molding operation, the film adheres to the resin surface and may be allowed to remain on the surface during subsequent handling. For example, in the case of a tabletop, the sheet may be allowed to remain on the surface during subsequent handling and assembling to the table frame and may be allowed to remain on the surface during shipping and eventually be easily stripped after delivery to the purchaser.

The method of this invention is particularly adapted for use in contact pressure and low pressure molding procedures where the pressures do not exceed about 500 p.s.i. THe described type of film may be used with a wide variety of synthetic resins, one limitation being that its use should be limited to processes wherein the temperature remains below the scorching or decomposition of the cellulose film. Resins which may be cast or molded by the present method include both thermoplastic resins and thermosetting resins.

Thermosetting resins include, for example, unsaturated polyester type resins which result from the reaction of a polyhydroxy compound and a polybasic acid and have reactive groups remaining in the molecule which will react when heated or in the presence of a catalyst or curing agent to form an infusible product, e.g., reaction product of glycerol and phthalic anhydride, reaction products of unsaturated dibasic acids including maleic, fumaric, itaconic, citraconic, or mesaconic with a dihydric alcohol including the polymethylene glycol series from ethylene glycol to decamethylene glycol and the polyethylene glycol series from diethylene glycol to nonaethylene glycol, dipropylene glycol, glycerol monoesters, glycerol and pentaerythritol. Modifiers may be added to the above thermosetting resins which copolymerize therewith when the resin is cured. Such modifying materials include polymerizable hydrocarbons containing a

linkage such as styrene, cyclopentadiene and divinyl benzene.

Thermoplastic resins include, for example, polystyrene, acrylic resins, e.g., polymers of acrylic acid, methacrylic acid and alkyl esters thereof; acrylonitrile polymers, vinyl resins, e.g., vinyl chloride-vinyl acetate copolymers, polymers of vinylidene chloride and another monomer; polyolefins, e.g., ethylene, propylene, and isobutylene polymers; polycarbonates, polyamides, polyesters, polyvinyl chloride, etc.

These resins may be mixed with fillers including wood flour, cotton floc, glass fibers, metallic filaments and particles, silicate fibers and particles, synthetic resin fibers and particles, rubber particles, asbestos fibers, mica particles, cellulose fibers, crystalline cellulose and the like. The resin may be used to impregnate fibrous sheets either woven or nonwoven. Dyes, pigments and coloring agents are also used therein.

The foregoing enumeration is intended merely to illustrate some of the thermoplastic and thermosetting resins, fillers, etc. which are satisfactory for the purposes of the invention.

The following examples are set forth to demonstrate the method of this invention.

EXAMPLE I

Regenerated cellulose test films containing various proportions of finely-divided cellulose particles were prepared by injecting aqueous dispersions of the finely-divided cellulose particles having varying solids concentrations into the viscose stream just prior to extrusion. The finely-divided cellulose particles were prepared by acid hydrolysis of a highly refined wood pulp, attriting the washed residue and spraying a water slurry of the attrited material at about a 15 percent solids concentration into an air stream having a temperature of between 500° and 600° F. The finely-divided material was of such particle sizes that at least 85 percent passed a 325 mesh screen and not more than 3 percent was retained on a 200 mesh screen. The viscose films were spun in a conventional manner whereby the wet-gel washed and regenerated films were passed through a plasticizer bath which also contained a water-soluble, melamine-formaldehyde precondensate in an amount to obtain films containing 0.1–0.2 percent, based on the weight of the conditioned films, of this anchoring agent.

These films were used in the preparation of polyester plastic panels which were then measured for gloss. The panels were prepared by first placing a sheet of the test film (12 in. by 12 in.) on a flat surface and pouring a small amount of a catalyzed resin on the center of the film.

The resin mixture was prepared by adding 4 g. of a mixture of 1 part benzoyl peroxide and 1 part tricresyl phosphate to every 100 g. of a thermosetting unsaturated polyester resin. This was mixed and allowed to stand for 1 hour prior to use.

A sheet of wood pulp (3 in. by 5 in.) was placed over the catalyzed resin and allowed to become saturated. Another small amount of the resin was poured over the pulp sheet and another sheet of the test film was placed over the resin.

Excess resin was squeezed from the wet laminate with a metal hand roller and the composite sheet placed in a hoop frame and tightly secured. THis assembly was placed in an oven at 190° F. for about 10 minutes at which time the resin had gelled. The assembly was removed from this oven and placed in another oven at 275° F. for 1 minute. The laminate was removed from the oven, permitted to cool and removed from the hoop frame. The top and bottom films adhered to the resin surfaces permitting considerable handling. The films were separated from the panels by peeling. The presence of the anchoring agent had no affect upon the gloss measurements.

Gloss measurements were made using a conventional 60° Gardner glossmeter which was calibrated within ±2 units using a highly polished standard (94 reading) and a lower gloss standard (42 reading). At least three readings were made in each direction for each test panel. The following table shows the glass measurements for test panels prepared with the above-described release films containing various amounts of finely-divided cellulose particles.

TABLE I

| Cellulose particle content, based on film weight | Gloss reading |
|---|---|
| none | 95–100 |
| 2.5% | 55–65 |
| 3.5% | 40–50 |
| 9.7% | 10–20 |
| 21% | 3–8 |

EXAMPLE II

Regenerated cellulose test films containing various proportions of several types of finely-divided spray dried cellulose materials were prepared as described in example I. The films also contained 0.1 percent of a melamine-formaldehyde anchor resin as described in example I.

The cellulose material identified as A was spray dried hydrolyzed cellophane and had an average particle size of 10–20 microns. The material identified as B was spray dried hydrolyzed refined wood pulp and had an average particle size of about 25 microns. The material identified as C was spray dried hydrolyzed refined wood pulp and had a maximum particle size of about 37 microns. The material identified as D was spray dried hydrolyzed wood pulp and had an average particle size of about 35 microns.

The films were used in the preparation of polyester plastic panels as described in example I. The thermosetting unsaturated polyester resin was the reaction product of polyoxyethylene isopropylidene diphenol and fumaric acid anhydride mixed with an equal proportion of styrene.

Gloss measurements were made using a conventional 60° Gardner glossmeter as described in example I. The following table shows the gloss measurements lengthwise and widthwise, for test panels prepared with the above-described release films. The resistance of the panels to fingerprinting was also noted.

TABLE II

| | Average particle size (microns) | Proportion based on film weight, percent | Gloss reading L | Gloss reading W | Fingerprinting resistance |
|---|---|---|---|---|---|
| Cellulose material: | | | | | |
| A | 10–12 | 10 | 14 | 12 | Good. |
| | | 20 | 5 | 6 | Do. |
| B | 25 | 10 | 26 | 24 | Do. |
| C | ¹37 | 10 | 17 | 17 | Do. |
| D | 35 | 10 | 19 | 22 | Do. |
| | | 20 | 6 | 6 | Do. |

¹ Maximum.

Although the invention has been illustrated by reference to regenerated cellulose films as the base film, other cellulosic film-forming materials such as, for example, cellulose ethers and esters, are equally satisfactory. For example, alkali solutions of hydroxyethyl cellulose may be substituted for the viscose solution.

The advantages of the molding method of the present invention are quite apparent. Molded articles having any predetermined gloss may be obtained employing a single highly polished mold or press plate merely by interposing a cellulosic sheet containing the finely-divided cellulosic material. The inexpensive films having different proportions of finely-divided cellulosic material may replace a plurality of expensive molds or press plates each having a specific surface finish. The gloss produced by the films may be predetermined by selection of finely-divided cellulosic material of different particle sizes and by the proportion of finely-divided cellulosic material incorporated in the film. The adherence of the film to the molded or formed surface may be varied by varying the proportion of the anchoring agent in the film.

Flat sheet laminates may be made in a continuous method. The desired fibrous sheets are drawn from rolls and impregnated with the desired resin as by passing the sheets through suitable resin baths. The impregnated sheets are then brought together, and a continuous cellulosic film containing the finely-divided cellulose material brought into contact with one surface of the laminated sheet and an inexpensive sheet, such as plain cellophane, wax paper, etc. is brought into contact with the opposite surface. The assembly is then passed between suitable rolls so as to bring the sheets into a desired compact relationship after which the assembly is passed through required heating zones to mold and cure the resin. Panels of desired size are cut from the laminate and stored. The surface film may be allowed to remain adhered to the surface during subsequent handling and peeled away when desired.

Since variations and modifications may be made in carrying out the invention, without departing from its spirit and scope, it is to be understood that the invention is not to be limited except as defined in the appended claims.

I claim:

1. In a method of forming a synthetic resin article wherein the resin is set in contact with a releasable film, the improvement which comprises setting the resin in contact with a nonfibrous cellulosic sheet containing from about 1 to about 30 percent, based on the weight of said sheet, of finely-divided, water-insoluble organic particles at least 90 percent by weight consisting of $\beta$–1,4 glucan or a water-insoluble derivative of $\beta$–1,4 glucan and the remainder consisting predominantly of other polysaccharides, at least about 85 percent by weight of said organic particles having a size no greater than about 44 microns, not more than about 3 percent by weight having a size greater than 75 microns and the average particle size ranging from about 10 to about 30 microns, and an anchoring agent selected from the group consisting of aldehyde resin precondensates and polyalkylenimines at least adjacent the surface of said cellulosic sheet contacting said resin in an amount sufficient to improve the adhesion of the sheet to said resin up to about 0.5 percent by weight of the sheet whereby said sheet can be removed from the resin article without damage thereto.

2. In a method as defined in claim 1 wherein the cellulosic sheet is a regenerated cellulose film.

3. The method of claim 2 wherein the regenerated cellulose film contains from about 2.5 percent to about 20 percent by weight of the finely-divided particles having an average particle size of about 15–20 microns and from about 0.1 percent to about 0.2 percent by weight of a melamine-formaldehyde anchoring agent.

4. The method of claim 1 wherein the finely-divided water-insoluble organic particles have been dried by spray drying.

* * * * *

PO-1050
(5/69)

UNITED STATES PATENT OFFICE
CERTIFICATE OF CORRECTION

Patent No. 3,627,870      Dated  12/14/71

Inventor(s)  Frank E. Carevic; John A. Mihalik and Alfred H. Stewart, Jr.

It is certified that error appears in the above-identified patent and that said Letters Patent are hereby corrected as shown below:

On Title Page, the inventor's name "Milhalik" should read --Mihalik--. Col. 1, line 7, "in" should be deleted. Col. 2, line 57, "or" should read --of--

Signed and sealed this 13th day of June 1972.

(SEAL)
Attest:

EDWARD M. FLETCHER, JR.
Attesting Officer

ROBERT GOTTSCHALK
Commissioner of Patents